United States Patent
Urquizo et al.

(10) Patent No.: US 7,177,408 B1
(45) Date of Patent: Feb. 13, 2007

(54) DEVICES, SOFTWARES AND METHODS FOR SELECTIVELY LIMITING THE DURATION OF AN INDIVIDUAL MODEM-ON-HOLD SESSION

(76) Inventors: Alex Urquizo, 7 Mountain Rd., Burlington, MA (US) 01803; Scott A. Boynton, 1033 Wallace Dr., San Jose, CA (US) 95120

( * ) Notice: Subject to any disclaimer, the term of this patent is extended or adjusted under 35 U.S.C. 154(b) by 173 days.

(21) Appl. No.: 10/661,029

(22) Filed: Sep. 11, 2003

Related U.S. Application Data

(63) Continuation of application No. 09/966,904, filed on Sep. 27, 2001, now Pat. No. 6,650,741.

(51) Int. Cl.
*H04M 11/00* (2006.01)

(52) U.S. Cl. .................. 379/93.28; 379/93.35

(58) Field of Classification Search ............ 379/93.35, 379/93.28, 93.29, 93.31, 93.09, 93.01, 93.14, 379/215.01
See application file for complete search history.

(56) References Cited

U.S. PATENT DOCUMENTS

| | | | |
|---|---|---|---|
| 6,263,016 B1 * | 7/2001 | Bellenger et al. ........... 375/222 |
| 6,345,088 B1 * | 2/2002 | Gu et al. ................. 379/93.35 |
| 6,426,946 B1 * | 7/2002 | Takagi et al. ............... 370/252 |
| 6,650,741 B1 * | 11/2003 | Urquizo et al. .......... 379/93.35 |
| 6,690,776 B1 * | 2/2004 | Raasch ..................... 379/93.35 |
| 6,912,276 B1 * | 6/2005 | Olafsson et al. ......... 379/93.35 |
| 2002/0154865 A1 * | 10/2002 | Olafsson ..................... 375/222 |

* cited by examiner

*Primary Examiner*—Stella Woo
(74) *Attorney, Agent, or Firm*—Marger Johnson & McCollom, P.C.

(57) ABSTRACT

Devices, softwares and methods selectively limit a duration of an individual modem-on hold session. A network device receives and holds data for an individualized on-hold timeout time limit for each user, such as an ISP subscriber.

26 Claims, 4 Drawing Sheets

| USER DATABASE | DB3 |
|---|---|
| USER NAME | TIMEOUT TIME LIMIT (SEC) |
| USER1 | 60 |
| USER2 | 120 |
| USER3 | 20 |
| ... | ... |

310 ESTABLISH FIRST MODEM CONNECTION WITH FIRST MODEM

320 ESTABLISH SECOND MODEM CONNECTION WITH SECOND MODEM

330 EXCHANGE DATA OVER THE FIRST AND SECOND MODEM CONNECTIONS

340 DETERMINE FIRST HOLD TIMEOUT TIME LIMIT (FROM USER INFO OR BY DECODING EXCHANGED DATA)

344 PLACE THE FIRST MODEM CONNECTION ON HOLD (STARTS FIRST HOLD SESSION)

347 PREVENT THE FIRST HOLD SESSION FROM EXCEEDING FIRST HOLD TIMEOUT TIME LIMIT

350 DETERMINE SECOND HOLD TIMEOUT TIME LIMIT (FROM USER INFO OR BY DECODING EXCHANGED DATA)

354 PLACE THE SECOND MODEM CONNECTION ON HOLD (STARTS SECOND HOLD SESSION)

357 PREVENT THE SECOND HOLD SESSION FROM EXCEEDING SECOND HOLD TIMEOUT TIME LIMIT

FIG. 3

DEVICES, SOFTWARES AND METHODS FOR SELECTIVELY LIMITING THE DURATION OF AN INDIVIDUAL MODEM-ON-HOLD SESSION

This application is a continuation of prior U.S. patent application Ser. No. 09/966,904, filed Sep. 27, 2001 now U.S. Pat. No. 6,650,741.

BACKGROUND OF THE INVENTION

1. Field of the Invention

The present invention is related to the field of modems and network servers, and more specifically to modems and servers that can request a Modem-On-Hold session and can discontinue such a session under certain conditions.

2. Description of the Related Art

Networks, such as the internet, are increasingly used for communications. Typically a user subscribes with an Internet Service Provider ("ISP") that is connected to the internet. The user has a host device, such as a personal computer. The host device can communicate over a telephone line with a network device of the ISP, such as a server. Then the user and the ISP exchange data over the modem connection, typically in binary form.

The host device includes a modem, which communicates over the telephone line. The server has individual ports, one for each user that calls in with a modem to log in.

Recently modems that are made according to the International Telecommunications Union (ITU) V.92 standard provide a new feature, which is called the Modem-On-Hold ("MOH"). The modem sends a MOH request to temporarily discontinue ("place on hold") the modem connection. The server receives the MOH request, and grants it by temporarily discontinuing the modem connection.

The MOH feature is useful to the user, because the telephone line is temporarily released. Then it can be used to receive an incoming call, or to place an outgoing call.

The MOH feature, however, is detrimental to the internet service provider. While the modem connection is temporarily discontinued, the port assigned to it by the server remains committed to the user, but unused. As such, it may not be assigned to another user. A number of users could abuse the privilege, employing the MOH feature for a long time.

BRIEF SUMMARY OF THE INVENTION

The present invention overcomes these problems and limitations of the prior art.

Generally, the present invention provides devices, softwares and methods for selectively limiting a duration of an individual modem-on hold session. A network device receives and holds data for an individualized on-hold timeout time limit for each user, such as an ISP subscriber.

The invention offers the advantage that ISPs may negotiate a higher price for services, for permitting a longer individualized on-hold timeout time limit. Plus, every user will pay for the level of service they need.

The invention will become more readily apparent from the following Detailed Description, which proceeds with reference to the drawings, in which:

BRIEF DESCRIPTION OF THE DRAWINGS

FIG. 2 is a diagram of a memory arrangement in the network device of FIG. 1.

FIG. 3 is a flowchart illustrating a method according to an embodiment of the present invention.

DETAILED DESCRIPTION OF THE PREFERRED EMBODIMENT(S)

As has been mentioned, the present invention provides devices, softwares and methods for limiting a duration of an individual modem-on hold session. The invention is now described in more detail.

Figure 1:
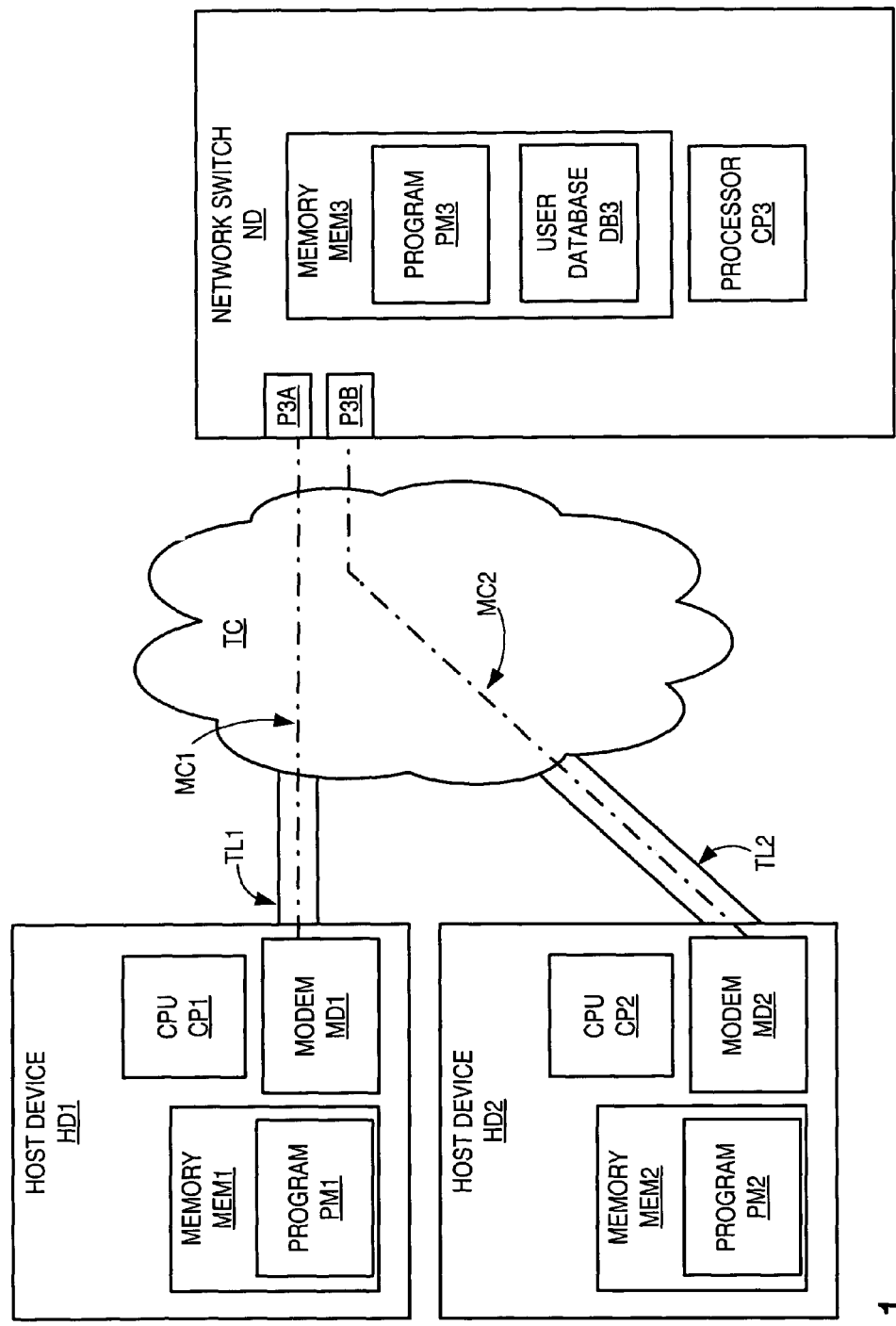
FIG. 1 is a diagram showing two host devices made according to embodiments of the invention communicating with a network device made according to an embodiment of the invention.

Referring now to FIG. 1, an arrangement is shown of two host devices HD1, HD2 communicating with a network switch ND, all of which are made according to the present invention. It will be understood that FIG. 1 shows only one of many possible arrangements. For example, host device HD1 may also communicate with a server that is not made according to the invention. Moreover, network switch ND may be accessed by a personal computer that is not made according to the invention. Host devices HD1, HD2 may be personal computers. Device HD1 includes a Central Processing Unit ("CPU") CP1, and a memory MEM1. CPU CP1 executes a program PM1 that resides on memory MEM1. Similarly, device HD2 includes a Central Processing Unit ("CPU") CP2, and a memory MEM2. CPU CP2 executes a program PM2 that resides on memory MEM2.

Importantly, host devices HD1, HD2 include modems MD1, MD2 respectively. Modem MD1 is connected via a telephone line TL1 to the telephone network TC. Modem MD2 is connected via a telephone line TL2 to the telephone network TC (also known as the telephone cloud).

Network switch ND may be any network switch, such as a server, a router, a gateway, a bridge, etc. Switch ND has at least two ports P3A, P3B for interfacing with the telephone network TC. These may be directly coupled with other internal modems (not shown) of switch ND, etc., as is known in the art.

Switch ND also has a processor CP3. Processor CP3 may be implemented as a Digital Signal Processor (DSP), Central Processing Unit (CPU), or any other equivalent way known in the art.

Switch ND additionally includes a memory MEM3, on which a program PM3 may reside. Functions of processor CP3 may be controlled by program PM3, as will become apparent from the below. In addition, memory MEM3 includes a user database DB3, which may include user attributes.

Host device HD1 is able to establish a first modem connection MC1 with network switch ND. First modem connection MC1 is from modem MD1 of host device HD1, over telephone line TL1. Similarly, host device HD2 is able to establish a second modem connection MC2 with network switch ND. Second modem connection MC2 is from modem MD2 of host device HD2, over telephone line TL2.

Host devices HD1, HD2 are thus able to exchange data with network switch ND. They are able to encode in such data a preference or choice as to the length of a respective individualized hold timeout time limit. They transmit the data to network switch ND, which stores it in memory MEM3.

Referring now to FIG. 2, user database DB3 is described in more detail. Different users are assigned different modem-on-hold timeout time limits. This part of the invention may be accomplished by making the hold timeout time limits part of the user profile, and relying on the fact that the users have different profiles to begin with. It will be understood that, if network switch ND is implemented by more than one device, portions of user database DB3 may be distributed among such devices.

Returning to FIG. 1, host devices HD1, HD2 are able to receive line requests. The line requests may be directly from the users, or may be automated, e.g. when a call is incoming over telephone lines TL1, TL2 respectively. Line requests are for different uses of telephone lines TL1, TL2. More particularly, a line request may be for temporarily releasing telephone line TL1, by temporarily placing modem connection MC1 on hold. Pursuant to such a line request, host device HD1 first generates a Modem-On-Hold (MOH) request. The MOH request is transmitted via modem connection MC1 to network switch ND.

Network switch ND is capable of receiving the MOH request. When the MOH request is received it is granted, which starts an individual Modem-On-Hold (MOH) session. This way the line request may be accommodated.

Network switch ND also has a timer (not shown separately) for measuring a duration of the individual MOH session. The timer is started when the MOH request is granted.

In addition, network switch ND prevents the individual MOH session from lasting longer than the corresponding associated individualized hold timeout time limit. When the time limit expires, the modem connection is disconnected. Moreover, if the individualized hold timeout time limit is preset to zero, then all MOH requests will be denied, including the first.

The present invention may be implemented by one or more devices that include logic circuitry. The device performs functions and/or methods as are described in this document. The logic circuitry may include a processor that may be programmable for a general purpose, or dedicated, such as microcontroller, a microprocessor, a Digital Signal Processor (DSP), etc. For example, the device may be a digital computer like device, such as a general-purpose computer selectively activated or reconfigured by a computer program stored in the computer.

Moreover, the invention additionally provides methods, which are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases, there should be borne in mind the distinction between the method of the invention itself, and the method of operating a computing machine. The present invention relates both to methods in general, and also to steps for operating a computer and for processing electrical or other physical signals to generate other desired physical signals.

The invention additionally provides programs, and methods of operation of the programs. A program is generally defined as a group of steps leading to a desired result, due to their nature and their sequence. A program made according to an embodiment of the invention is most advantageously implemented as a program for a computing machine, such as a general-purpose computer, a special purpose computer, a microprocessor, etc.

The invention also provides storage media that, individually or in combination with others, have stored thereon instructions of a program made according to the invention. A storage medium according to the invention is a computer-readable medium, such as a memory, and is read by the computing machine mentioned above.

The steps or instructions of a program made according to an embodiment of the invention requires physical manipulations of physical quantities. Usually, though not necessarily, these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is preferred to implement and describe a program as various interconnected distinct software modules or features, individually and collectively also known as software and softwares. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

Referring now to FIG. 3, a flowchart 300 is used to illustrate a method according to an embodiment of the invention. The method of flowchart 300 may also be practiced by network switch ND of FIG. 1. Alternately, it may be practiced by a combination of cooperating network switches.

According to a box 310, a first modem connection is established with a first modem.

According to a next box 320, a second modem connection is established with a second modem.

According to a next box 330, data is exchanged over the first and second modem connections. The data exchange may be concurrent, although that is not necessary for practicing the invention.

The data exchange may serve to identify the users of the first and second modems. Identification may take place by using an Authentication, Authorization, and Accounting (AAA) server, although the invention is not limited in this regard. Such an AAA server usually performs these AAA functions by interacting with network access or gateway devices and databases and directories containing user information. The interaction may be by according to a suitable standard. An example of such a standard today is the RADIUS (Remote Authentication Dial In User Service) standard.

According to a next box 340, a first hold timeout time limit is determined. That may be from information of the user, such as the user profile. This may be implemented by a special protocol to determine the status of the current user through authentication and authorization processes.

Alternately, the first hold timeout time limit may be determined by decoding the exchanged data. According to a next box 344, the first modem connection is placed on hold. This starts a first hold session. According to a next box 347, the first hold session is prevented from exceeding the first hold timeout time limit, as determined in box 340. Prevention may be performed by disconnecting the modem connection, or by invading in the telephone line to reestablish it. The user may have a timer, which warns when the time comes.

In the event the method of the invention is being performed by cooperating network switches, the controlling server may send to the access server a Modem-On Hold attribute. Then this data will be sent to a Registration, Admission, and Status (RAS) protocol platform of the access server.

According to a next box 350, a second hold timeout time limit is determined. That may be from information of the user, such as the user profile. Alternately, it may be determined by decoding the exchanged data. According to a next box 354, the second modem connection is placed on hold. This starts a second hold session. According to a next box 357, the second hold session is prevented from exceeding the second hold timeout time limit, as determined in box 350.

Accordingly, the hold timeout time limit is configurable on a per user basis. This may be by a special protocol, which can use a vendor specific attribute (VSA) capability to configure the modem-on hold maximum duration for dial-in users, such as dial-in subscribers. A new attribute will be added to the protocol as per the invention, whose value will indicate the maximum on-hold time the user is allowed to be on. Once a server implementing the protocol has determined authorization for a specific user (through user identification and password), the server may then send a response to the access server, which will take the respective action.

If the data received from the radius server contains a modem on hold attribute, this data will be sent from the host operating system to a remote access server ("RAS") platform. The RAS platform has features (e.g. appropriate DSP) that may use the MOH configuration to negotiate with the client modem the maximum allowed on-hold time the user is granted.

If the host operating system does not send a command to configure the modem on hold parameters, the RAS platform's features may instead use a default value, specified through an appropriate tool, such as modemcaps.

Modemcaps is an informal name for a database that contains elements of a modem capability. The database is used to configure the modem, usually when it becomes idle.

Figure 4:
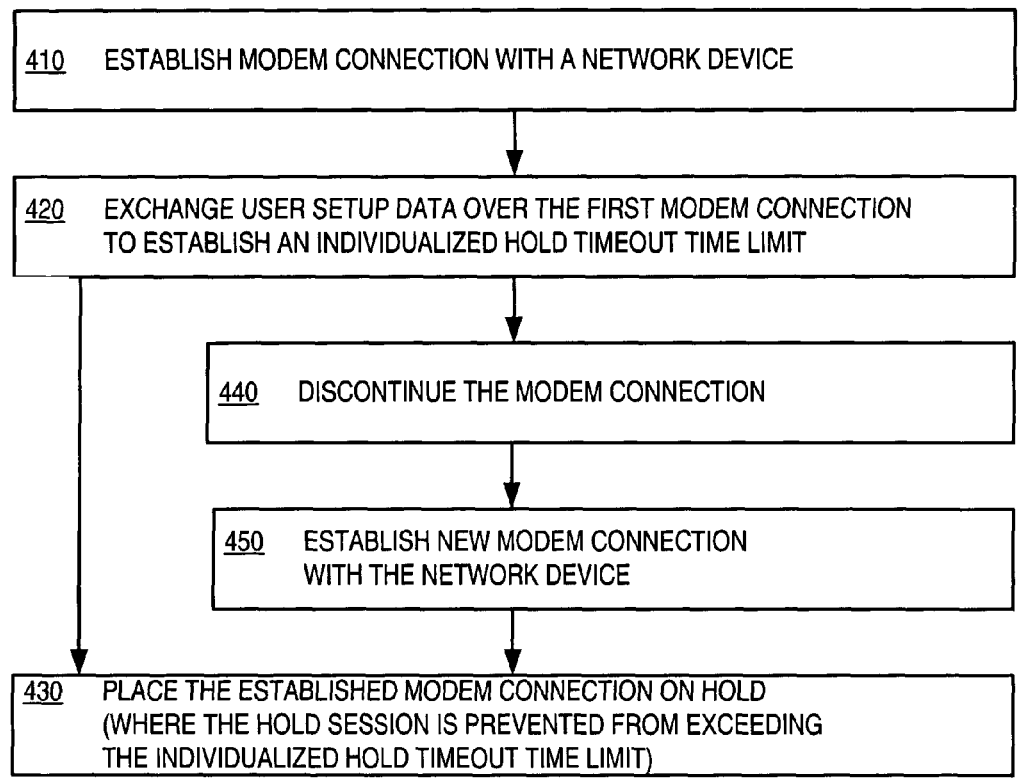
FIG. 4 is a flowchart illustrating a method according to another embodiment of the present invention.

Referring now to FIG. 4, a flowchart 400 is used to illustrate a method according to another embodiment of the invention. The method of flowchart 400 may also be practiced by either one or both of host devices HD1, HD2 of FIG. 1.

According to a box 410, a modem connection is established with a network device.

According to a next box 420, user setup data is exchanged over the first modem connection, to establish an individualized hold timeout time limit. The time limit may be within a range, such as 10 sec to 16 minutes. Values outside the range can mean different conditions. For example, a value of zero may mean that none is allowed. A value over 16 minutes may mean that it is unlimited. The network device negotiates with the client modem at the physical layer a value for the duration of a MOH session.

According to a next box 430, the established modem connection is placed on hold. This is accomplished by issuing a request. It is known, however, that a subsequent request for a modem on hold session will be granted only up to the individualized hold timeout time limit. After the time limit, the established modem connection will be discontinued.

Alternately, execution may proceed from box 420 first to box 440, where the modem connection is discontinued. That would be if the previous log-in session were a set up session.

According to a next box 450, a new modem connection is established with the network device. That would be during a subsequent log-in session. The log-in user is again identified, and the individual attributes retrieved as per the above. Execution would then continue with box 430, as per the above.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and nonobvious. Additional claims for other combinations and subcombinations of features, functions, elements and/or properties may be presented in this or a related document.

The invention claimed is:

1. A device comprising:
a telephone port for coupling to a telephone network; and
one or more processors coupled with the telephone port to:
establish a modem connection with each of a plurality of modems over a one or more telephone lines;
store an individualized hold timeout time limit associated with a user profile prior to establishing the modem connection;
exchange data over the modem connection wherein the data includes a user attribute; and
retrieve the individualized hold timeout time limit for the user profile associated with the user attribute.

2. The device according to claim 1 wherein a processor that retrieves the individualized hold timeout limit may be the same or different from the one or more processors that establish the modem connection.

3. The device according to claim 1 including the one or more processors to:
place the modem connection on hold from the exchanging of data to start a hold session; and
prevent the hold session from exceeding the individualized hold timeout time limit.

4. The device according to claim 3 wherein the data includes instructions to cancel the hold session or disconnect the modem connection upon an expiration of the individualized hold timeout time limit.

5. A method comprising:
establishing a connection with a modem over a telephone line;
receiving a request for a modem on hold state including a user attribute;
associating a user profile with the user attribute;
decoding an individualized modem on hold time limit included in the user profile for the connection; and
placing the connection in the modem on hold state in response to the request.

6. The method according to claim 5 including terminating either the modem on hold state or the connection at the conclusion of the individualized modem on hold time limit.

7. The method according to claim 5 including retrieving the user profile from a database using a same or a different processor that establishes the modem connection.

8. The method according to claim 5 including determining an identification of the current user through an authentication and authorization process.

9. The method according to claim 5 wherein the request includes instructions to cancel the modem on hold state or disconnect the connection upon the expiration of the individualized modem on hold time limit.

10. A system comprising:
one or more processors;
a database storing an individualized modem on hold (MOH) timeout limit associated with an endpoint identification; and
one or more modems that send a modem timeout request over a telephone network, wherein the one or more modems temporarily cease communicating according to the MOH timeout limit determined by the one or more processors according to the endpoint identification associated with each of the one or more modems and in response to the modem timeout request.

11. The system according to claim 10 including a database storing the individualized user profile, wherein the one or more processors retrieves the individualized MOH timeout limit associated with the individualized user profile.

12. The system according to claim 10, wherein the individualized user profile includes a predetermined user response to the individualized MOH timeout limits.

13. An apparatus comprising:
a network interface;
a modem communicating across the network interface;
a database storing an endpoint specific timeout limit associated with an endpoint identification; and
an endpoint device that sends a modem timeout request over the network interface, wherein the modem temporarily ceases communicating according to the endpoint specific timeout limit associated with the endpoint identification included with the modem timeout request.

14. The apparatus according to claim 13 wherein the endpoint specific timeout limit is associated with the endpoint identification according to a stored endpoint profile.

15. The apparatus according to claim 13 wherein the modem timeout request includes instructions to cancel the modem on hold state or disconnect the connection upon the expiration of the endpoint specific timeout limit.

16. A method comprising:
establishing a modem communication session over a phone line;
sending a request for a modem on hold timeout;
providing a user identification;
determining an individualized modem on hold timeout limit associated with the user identification;
establishing a non modem communication session over the phone line; and
terminating either the non modem communication session or the modem communication session at the conclusion of the individualized modem on hold timeout limit according to a user profile.

17. The method according to claim 16 including determining the individualized modem on hold timeout limit according to the user profile associated with the user identification.

18. The method according to claim 16 including sending a request to terminate the modem communication session prior to the conclusion of the individualized modem on hold timeout limit; and
continuing the non modem communication session.

19. A system for managing a modem connectivity session, the apparatus comprising:
means for establishing a modem connection for each of a one or more modems;
means for associating a user profile with the modem connection;
means for storing a connection specific hold timeout limit and a predefined system response associated with the user profile prior to establishing the modem connection:
means for determining the connection specific hold timeout limit for each of the one or more modems according to the user profile;
means for placing each of time one or more modems in a modem on hold state; and
means for terminating either the modem on hold state or the modem connection at the conclusion of the connection specific hold timeout limit according to the system response.

20. The system according to claim 19 including a means for determining a system response at the completion of the connection specific hold timeout limit according to instructions contained in the user profile.

21. The system according to claim 20 including a means for updating the user profile according to a user request received during the modem connectivity session.

22. The system according to claim 19 including a means for canceling the modem connection during the modem on hold state and maintaining a non modem connection.

23. A computer-readable medium containing a program for managing modem sessions, the program comprising:
   instructions for establishing a modem session for each of a one or more modems;
   instructions for associating a predefined modern specification with the modem session;
   instructions for storing an individualized modem hold timeout limit and a redefined session response associated with the modem specification prior to establishing the modern session;
   instructions for retrieving the individualized modem on hold timeout limit for each of the one or more modems according to the modem specification; and
   instructions for placing the one or more modems in a modem on hold state; and
   instructions for terminating either the modem on hold state or the modem session at the conclusion of the individualized modem hold timeout limit according to the predefined session response.

24. The program according to claim 23 including instructions for determining a system response at the completion of the individualized modem on hold timeout limit.

25. The program according to claim 23 wherein the predefined modem specification is saved in a database.

26. The program according to claim 23 including instructions for canceling the modem session during the modem on hold state and maintaining a non modem session.

* * * * *